(12) United States Patent
Johnson

(10) Patent No.: US 11,679,831 B2
(45) Date of Patent: Jun. 20, 2023

(54) ADJUSTABLE DISARTICULATED SADDLE HAVING INDEPENDENT SUSPENSION SYSTEM AND METHODS OF USE THEREOF

(71) Applicant: Joe Johnson, Windsor, CO (US)

(72) Inventor: Joe Johnson, Windsor, CO (US)

( * ) Notice: Subject to any disclaimer, the term of this patent is extended or adjusted under 35 U.S.C. 154(b) by 0 days.

(21) Appl. No.: 17/917,334

(22) PCT Filed: Dec. 22, 2021

(86) PCT No.: PCT/US2021/064826
§ 371 (c)(1),
(2) Date: Oct. 6, 2022

(87) PCT Pub. No.: WO2022/146818
PCT Pub. Date: Jul. 7, 2022

(65) Prior Publication Data
US 2023/0150598 A1    May 18, 2023

Related U.S. Application Data

(60) Provisional application No. 63/256,837, filed on Oct. 18, 2021, provisional application No. 63/131,014, filed on Dec. 28, 2020.

(51) Int. Cl.
*B62J 1/10*   (2006.01)
*B62J 1/00*   (2006.01)
*B62J 1/28*   (2006.01)
*B62J 1/20*   (2006.01)

(52) U.S. Cl.
CPC ............... *B62J 1/10* (2013.01); *B62J 1/007* (2013.01); *B62J 1/20* (2013.01); *B62J 1/28* (2013.01)

(58) Field of Classification Search
CPC ....... B62J 1/10; B62J 1/007; B62J 1/20; B62J 1/28
See application file for complete search history.

(56) References Cited

U.S. PATENT DOCUMENTS

| 9,682,737 | B2 * | 6/2017 | Mori | ......................... B60N 2/40 |
| 10,286,825 | B2 * | 5/2019 | Boland | .................... B60N 2/99 |
| 2004/0026968 | A1 * | 2/2004 | Kim | .......................... B62J 1/10 |
| | | | | 297/201 |

(Continued)

FOREIGN PATENT DOCUMENTS

CN            205769746 U        12/2016

OTHER PUBLICATIONS

International Search Report and Written Opinion dated Jun. 14, 2022 in International Application No. PCT/US21/64826, 28 pages.

*Primary Examiner* — Philip F Gabler
(74) *Attorney, Agent, or Firm* — Berg Hill Greenleaf Ruscitti LLP

(57) ABSTRACT

The invention includes apparatus and methods of use for an adjustable disarticulated seat, which in a preferred embodiment may include one, or a plurality of independently or synchronously adjustable disarticulated inserts positioned within insert interface apertures on the distal extended portion of a saddle. An actuator element may be responsive to the one or more disarticulated inserts through one or more cords configured to be retracted or release in response to the action of the actuator causing the extension upward or release downward movement of the one or more inserts within the insert interface aperture.

14 Claims, 10 Drawing Sheets

(56) References Cited

U.S. PATENT DOCUMENTS

| | | |
|---|---|---|
| 2005/0212337 A1 | 9/2005 | Lee |
| 2013/0334787 A1 | 12/2013 | Gosseen et al. |
| 2014/0132047 A1* | 5/2014 | Eldredge .................. B62J 1/005 297/201 |
| 2015/0175230 A1 | 6/2015 | Baruzzo |
| 2016/0325799 A1 | 11/2016 | Ogawa et al. |

* cited by examiner

ADJUSTABLE DISARTICULATED SADDLE HAVING INDEPENDENT SUSPENSION SYSTEM AND METHODS OF USE THEREOF

CROSS-REFERENCE TO RELATED APPLICATION

This application is a national stage application under 35 U.S.C. 371 of PCT Application No. PCT/US21/64826 having an international filing date of Dec. 22, 2021, which designated the United States, which PCT application claimed the benefit of U.S. Application Ser. No. 63/131,014, filed Dec. 28, 2020, and of U.S. Application Ser. No. 63/256,837, filed Oct. 18, 2021, all of which are incorporated by reference in their entirety.

TECHNICAL FIELD

Generally, the inventive technology disclosed herein relates to the field of saddles, and more particularly an adjustable disarticulated seat that may be configured for use with a bicycle or motorcycle.

BACKGROUND

A bicycle is a human-powered two-wheel vehicle that is powered by a pedal, chain, and gear assembly. The common shape of the bicycle is upright position that includes cross handlebars and a seat for an individual. Bicycles are used for various purposes: commuting, delivery services, recreation, racing and novelty bicycles such as BMX bikes. One essential component of the bicycle is the bicycle seat or saddle that varies in design based upon the use of bicycle, type of bicycle, and the type of riding. The type of seat used is very dependent upon the position of the rider in most instances. When using a comfort or hybrid type of bicycle, a cyclist will sit higher over the seat where their weight is directed downward on the saddle, consequently a wider and more cushioned saddle is more suitable for such use. Racing or road bicycles use narrow and harder seats to provide less friction and interference with the fast pedal movements associated with racing. Also, racers tend to bend over, therefore weight is more evenly distributed between the handlebars and the saddle as opposed to the hybrid or comfort style of bicycle.

Many bicycle seats fall into specific broad categories, which include the race or road style seat that tends to be a narrow lightweight seat with a stiffer top. Mountain style seats are fairly narrow in shape with additional padding to soften blows and to adjust for some of the off-road conditions of mountain biking. Some bicycle seats include gel type cushioning to absorb shocks and to mold to the shape of the rider's body. Other bicycle seats have suspension that supplies support on the underside of the seat and other seats include cutaway sections where material is removed to eliminate some of the pressure points along the seat. As noted above, the more comfort or hybrid type of riding bicycles include wide cushioned seats that supply lots of padding and may include some ring support for the underside. These seats are very conducive for cyclists who are not pedaling very fast or riding aggressively. Consequently, various seat designs exist in the prior art. However additional designs are conceivable and needed to provide even more comfortable seat configurations for bicycle riding.

In particular, many riders experience discomfort attributable to even moderate durations spent seated upon a saddle, be it a bike or motorcycle or even stationary exercise device. The multitude of bicycle seats on the market attests to the wide range of rider preferences and suggests that the final solution has yet to be found. Seat comfort depends on many factors, among which are, the compliance or firmness of the padding, the appropriate seating surface shape, rider anatomy, compliance and/or responsiveness to rider motion associated with pedal operation, and even individual rider preference. For example, the thickness of padding along with the density or firmness of the padding also has an effect on comfort. Generally, increased pressure between the rider's body and the seat results in increased discomfort for the rider. The opposite is also true: decreasing pressure generally results in decreased discomfort. In an effort to reduce pressure, some seat designs have targeted specific areas of the rider's body that are less able to withstand pressures by completely removing material from the seating surface (cutout seats), thus eliminating pressure at that spot. However, such seats invariably must increase the pressure elsewhere on the body because the same portion of the rider's body weight is now supported over a decreased surface area, thus increasing the pressure on the parts of the body that remain in contact with the remaining surface of the seat and are more able to tolerate such increased loading.

As described above, there is a need for a bicycle or motorcycle saddle system that better accommodates the rider, provides a desired level of compression for comfort, and can satisfy the individual preferences of more than one class, gender, or physical shape of a user. The present invention discloses such a system.

SUMMARY OF THE INVENTION

One aspect of the invention includes apparatus and methods of use for an adjustable disarticulated seat, which in a preferred embodiment may include one, or a plurality of independently or synchronously adjustable disarticulated inserts positioned within insert interface apertures on the distal extended portion of a saddle or seat (the terms being generally interchangeable herein). An actuator element may be responsive to the one or more disarticulated inserts through one or more cords configured to be retracted or released in response to the action of the actuator causing the extension upward or release downward movement of the one or more inserts within the insert interface aperture.

In one preferred aspect, one or more cords may be secured within one or more insert channels on the disarticulated insert(s) such that activation of the actuator causes the cords to retract, or be tensioned, and extend the disarticulated insert, or alternatively the actuator may be disengaged causing the cords to be released, or slackened, allowing the disarticulated insert to be depressed downward. In this embodiment, when extended, the disarticulated insert may form a suspension system, such that the tensioned cords may exhibits tensile force allowing the cords to exhibit a counter-suspension force against the pressure exerted by a user against the disarticulated insert. In this aspect, the material used, and level of retraction, or tension of the cord(s) of the invention can adjust the counter-suspension force of the disarticulated inserts.

Another aspect of the invention includes apparatus and methods of use for an adjustable disarticulated seat, which in a preferred embodiment may include one, or a plurality of independently or synchronously adjustable disarticulated inserts positioned within insert interface apertures on the distal extended portion of a saddle or seat and, being disarticulated from the body of the saddle, may independently adjust in both lateral and vertical direction according to weight or pressure changes applied by a user during use.

Another aspect of the invention includes an apparatus and methods of use for an adjustable disarticulated seat, having one or a plurality of independently or synchronously adjustable disarticulated inserts positioned within insert interface apertures on the distal extended portion of a saddle or seat may be extended according to a user's desire and provide a raised or extended compression surface for a user's gluteal region or buttocks having a decreased surface area. In this aspect, the disarticulated inserts may include an extended compression support surface, such as a gel or air filled region to increase its compressive profile.

Another aspect of the invention includes an apparatus and methods of use for an adjustable disarticulated seat, having one, or a plurality of independently or synchronously adjustable disarticulated inserts positioned within insert interface apertures on the distal extended portion of a saddle or seat that may be released according to a user's desire and become approximately flush with the upper surface of the saddle providing a large surface area in-line with the upper surface of the saddle for a user's gluteal region or buttocks to rest.

One aspect of the invention includes apparatus and methods of use for an adaptive compressive seat, which in a preferred embodiment may include one, or a plurality of independently or synchronously adjustable disarticulated compressive inserts, having an extended compression matrix, positioned within insert pockets on the distal extended portion of a base configured to be coupled to, or form a seat, that may further be coupled with a compressive seat frame. An actuator element may be responsive to the one or more disarticulated inserts through one or more cords configured to be retracted or released in response to the action of the actuator causing the extension upward or release downward movement of the one or more inserts within the insert interface aperture.

In one preferred aspect, one or more cords may be secured within one or more cord channels on the disarticulated compressive insert(s) or a coupled insert support, such that activation of the actuator causes the cords to retract, or be tensioned, and extend the disarticulated insert compressive, or alternatively the actuator may be disengaged causing the cords to be released, or slackened, allowing the disarticulated compressive insert to be depressed downward. In this embodiment, when extended, the disarticulated insert may form a suspension system, such that the tensioned cords may exhibits tensile force allowing the cords to exhibit a counter-suspension force against the pressure exerted by a user against the disarticulated insert. In this aspect, the material used, and level of retraction, the type and position of a compression matrix, or tension of the cord(s) of the invention can adjust the counter-suspension force of the disarticulated inserts.

Another aspect of the invention includes apparatus and methods of use for an adaptive compressive seat, which in a preferred embodiment may include one, or a plurality of independently or synchronously adjustable disarticulated compressive inserts further having an extended compression matrix positioned within insert pocket of a base, that may be coupled with, or form a vehicle seat, being disarticulated from the body of the base, may independently adjust in both lateral and vertical direction according to weight or pressure changes applied by a user during use.

Another aspect of the invention includes an apparatus and methods of use for an adjustable disarticulated seat, having one or a plurality of independently or synchronously adjustable compressive inserts further having an extended compression matrix positioned within an insert pocket of a base and providing a raised or extended compression surface for a user's gluteal region or buttocks having a decreased surface area. In this aspect, the disarticulated compressive inserts may include an extended compression matrix including a plurality of interconnected series of scaffold supports that are configured to be compressed in response to an externally applied force.

The numerous aims, features, and functions of the various embodiments of the adjustable disarticulated saddle system will become readily apparent and better understood in view of the description and accompanying drawings. The following description is not intended to limit the scope of the adjustable disarticulated saddle system including methods of use and creation as are evidently shown below, but instead merely provides exemplary embodiments for ease of understanding.

BRIEF DESCRIPTION OF FIGURES

The inventive adjustable disarticulated saddle described with reference to the accompanying drawings which show preferred embodiments according to the device described herein. It will be noted that the device as disclosed in the accompanying drawings is illustrated by way of example only. The various elements and combinations of elements described below and illustrated in the drawings can be arranged and organized differently to result in embodiments which are still within the spirit and scope of the device described herein.

DETAILED DESCRIPTION OF THE INVENTION

The present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent applications.

Figure 1:
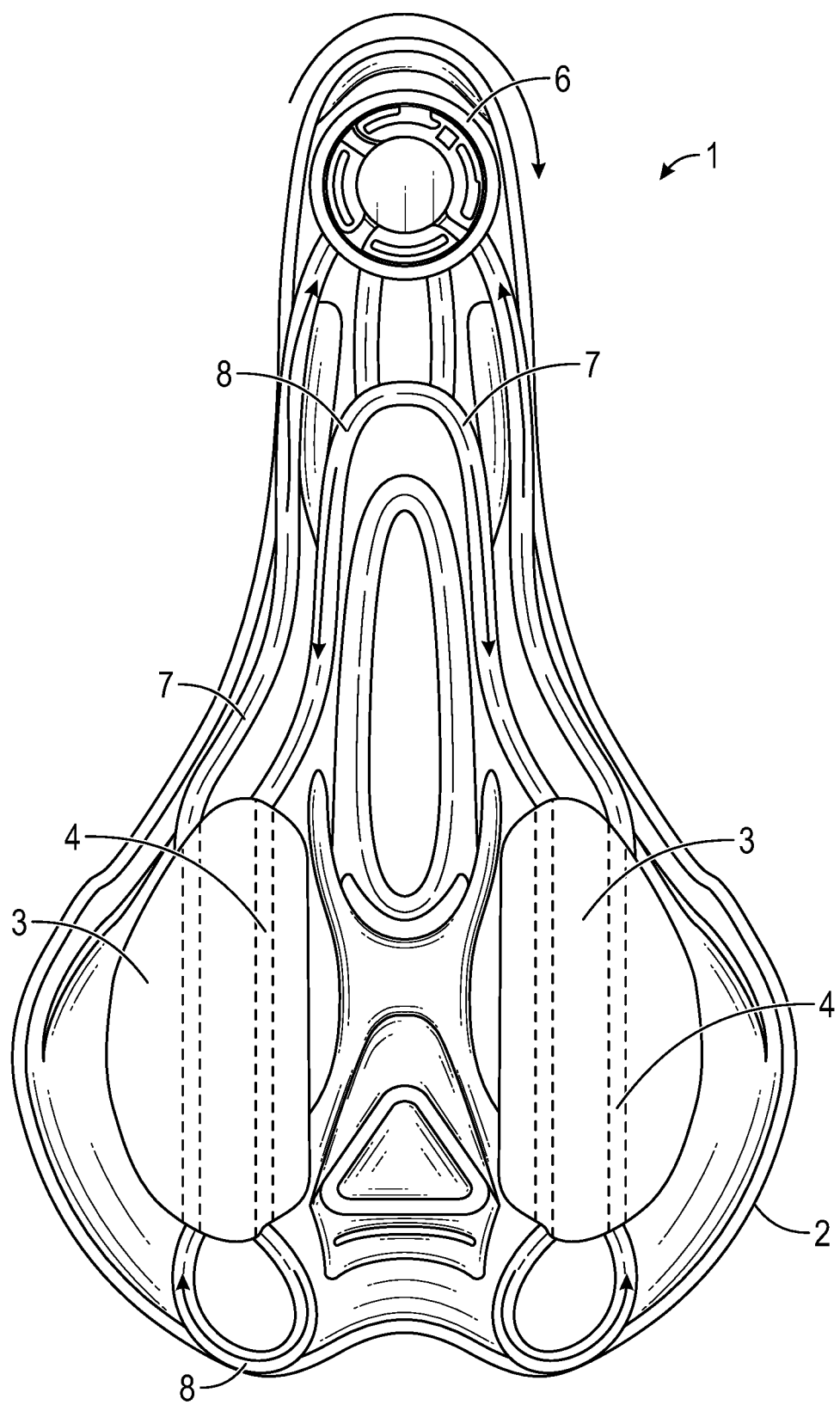
FIG. 1: show a bottom view of an adjustable disarticulated saddle having two disarticulated inserts coupled with an actuator device through a cord in one embodiment thereof.
Figure 2:
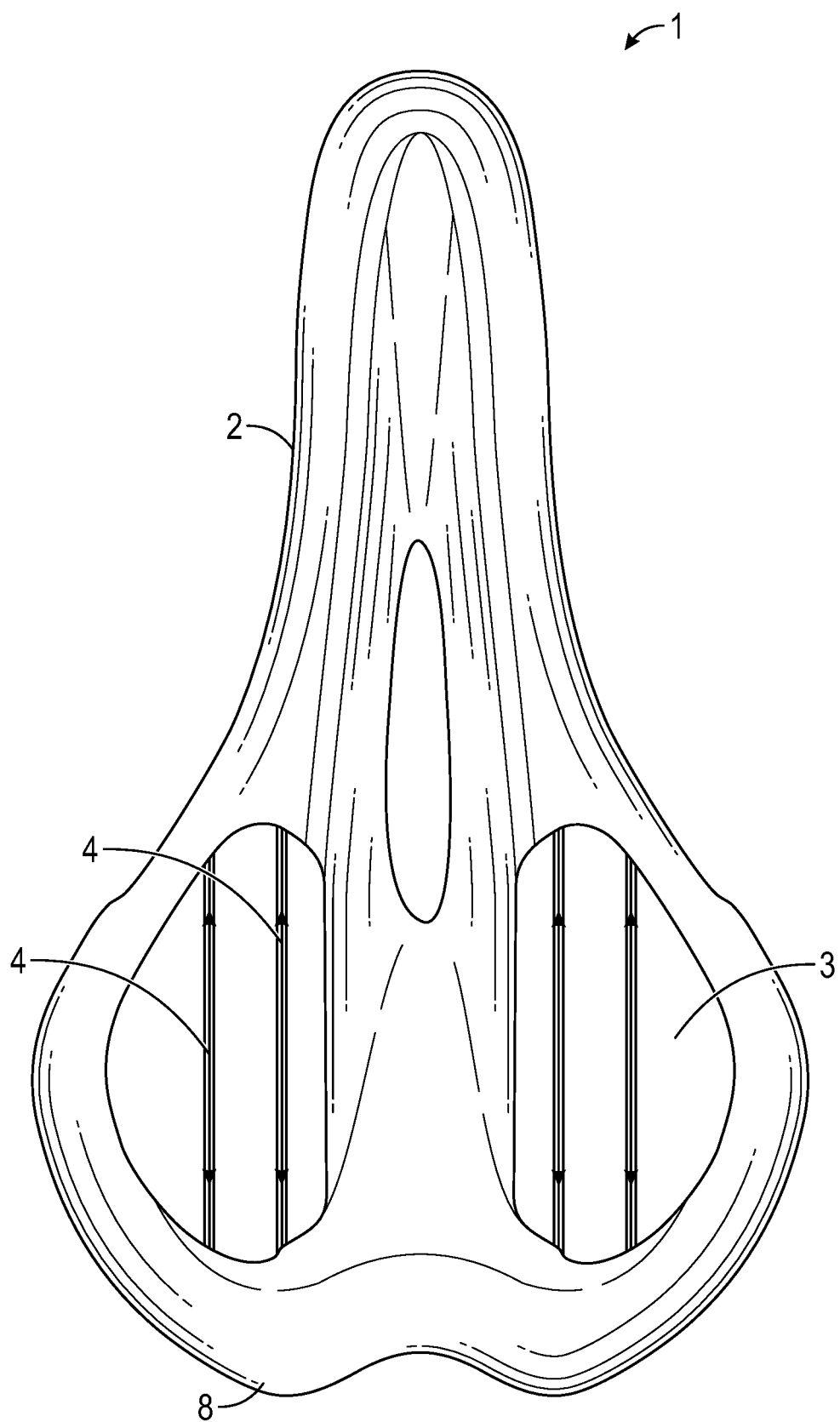
FIG. 2: show a top view of an adjustable disarticulated saddle having two disarticulated inserts coupled with an actuator device through a cord positioned within the inserts in an opposing configuration in one embodiment thereof.

The invention may include a novel adjustable disarticulated seat (1) that may be used with a bicycle, motorcycle, chair, exercise machine, or any apparatus that may support the gluteal region of a user. As generally shown in FIG. 1, in one preferred embodiment, the adjustable disarticulated seat (1) may include a saddle (2) comprising a top and bottom surface and which may further be shaped to conform to the anatomical dimension of a user. Notably, as shown in the Figures, the saddle (2) is shown as a generalized bike seat, however this is an exemplary embodiment as a saddle (2) of the invention may include a motorcycle seat, a chair, a car seat, such as an office chair, or the seat of an exercise machine and the like. In certain embodiments, the saddle may be a unitary component, such as a 3-D printed saddle that may further include additional elements such as a bike or motorcycle frame attachment, or top surface cover and the like.

Referring to FIG. 1, the adjustable disarticulated seat (1) may include a saddle (2) having one or more insert interface apertures (5) which, in this embodiment include adjacent void positioned at the distal end of the saddle (2) which may further be positioned to be positioned below and support a user's gluteal region. As shown in FIG. 1, the insert interface apertures (5) may be shaped to confirm to the surface area dimension of the corresponding saddle (2) structure, however the placement and shape of the insert interface apertures (5) can be variable in size, and position on the saddle. Also, while in this preferred embodiment the insert interface apertures (5) are shown as complete voids that span the width of the saddle (2), in certain embodiments the insert interface apertures (5) may include a recess that may be positioned on the saddle (2) and accommodate a disarticulated insert of the invention as discussed below.

Referring to FIGS. 1-4, in a preferred embodiment, one or more disarticulated insert may be positioned within each of the insert interface apertures (5) having one or more insert channels (4), which may preferably be positioned laterally in relation to the disarticulated insert (2). (It should be noted that this configuration is a preferred embodiment, as multiple configurations of inert channels can be contemplated, including diagonal, split, crossing, overlapping, sideways etc. . . . ) In a preferred embodiment, an insert channel (4) may be configured to secure a cord (7), which may include wires, cables, or other similar components, that is responsive to at least one actuator (6) such that activation of the actuator (6) may cause the cord (7) to retract causing the disarticulated insert (5) positioned within the insert interface aperture (5) to extend upward and press against the gluteal regions of a user. In additional embodiments, a cord (7) may be positioned directly within a cord or insert channel, while it may optionally be positioned within a removable cord cylinder (not shown) that may be secured within a cord or insert channel of the invention. In this embodiment, the cord cylinder may be made of a material that facilitate the independent movement of the encased cord (7), such as Teflon®, thermoplastics or composite material.

Notably, in this embodiment, the cord (7) does not need to be anchored to the saddle (2). Moreover, in the event a compression cord (7) breaks, or losses tensile strength and requires replacement, a user can remove the cord cylinder (not shown) from the cord channel (10) of the saddle (2) and may either replace it with a new cord cylinder (not shown) and/or cord (7), or re-thread the cord cylinder (not shown) with a new cord (7). The new cord cylinder (not shown) and/or cord (7) may be re-secured within the cord and/or insert channels of the invention and further re-engaged with an actuator (8). As noted above, while in this embodiment the first and second insert channels (4) are positioned length wise along the disarticulated inserts (3), in alternative embodiments one or a plurality of insert channels (4) may be positioned horizontally, diagonally, or in an overlapping and operate in a similar fashion as described above to generate a synchronous (or asynchronous in the case of multiple) actuators coupled with individual or groups of disparate disarticulated inserts (3), extension or release or the coupled inserts (3). Also, in additional embodiments, a cord cylinder (not shown) may form a single unbroken component that is positioned within both the cord channel (10) insert channels (4) of the invention, while in alternative embodiments a cord cylinder (not shown) may be configured in a discontinuous manner such that it may be positioned within the cord channel (10) or insert channels (33), but not across the gap between the body of the saddle (2) and disarticulated inserts (5).

In another embodiment, the cord (7) may be positioned within a cord channel (10) that may be integral or separate from the saddle (2) body. As shown in FIG. 1, a cord channel (10) may be positioned on the bottom surface of the body of the saddle (2) and may be configured to secure a cord (7) responsive to at least one actuator (6). As also shown in FIG. 1, the actuator (6) of the invention may also be coupled with the (saddle), and preferably the underside of the saddle, and even more preferably that proximal end of the saddle (2) which allows for easier access by a user positioned on a bike, motorcycle, or chair and the like. As shown in the FIGS. 1 and 3, the actuator (6) may be configured to secure and wind the cord (7) causing the cord to tighten and extend the disarticulated insert (3) as described above. Conversely, the actuator (6) may be configured to release and wound the cord (7) causing the cord to slacken and release the disarticulated insert (3) and allow it to retract back into the insert interface aperture (5). In this preferred embodiment, the actuator may include one or more locking positions such that a user can retract or release the cord (7), and by extension adjust the degree of extension or release of the disarticulated inserts (3), according to a personal preference or optimization of use. Notably, a variety of actuators may be considered as encompassed by the invention, for example, in certain embodiments, an actuator (6) may be selected from the group consisting of: a twist actuator, a pull actuator, a detachable actuator, an electric actuator, and a pressure actuator.

Figure 3:
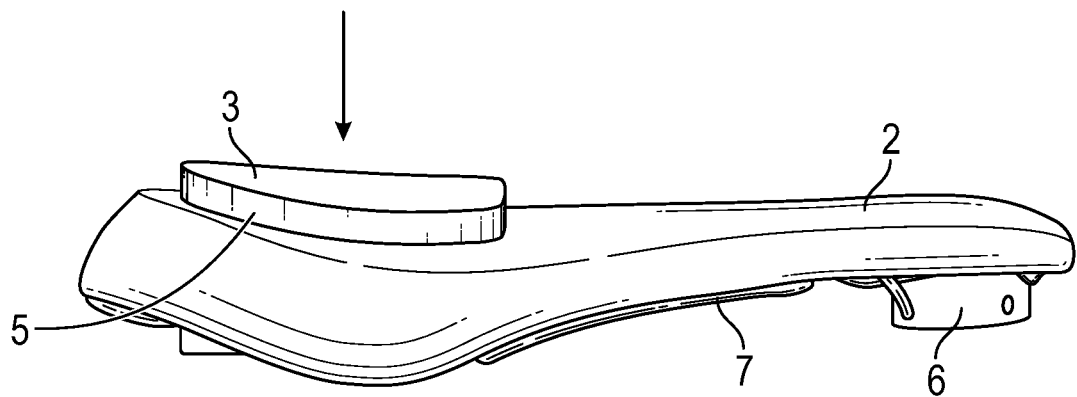
FIG. 3: show a side view of an adjustable disarticulated saddle having two disarticulated inserts coupled with an actuator device through a cord and showing the travel distance of the insert's extension and retraction movement in one embodiment thereof.
Figure 4:
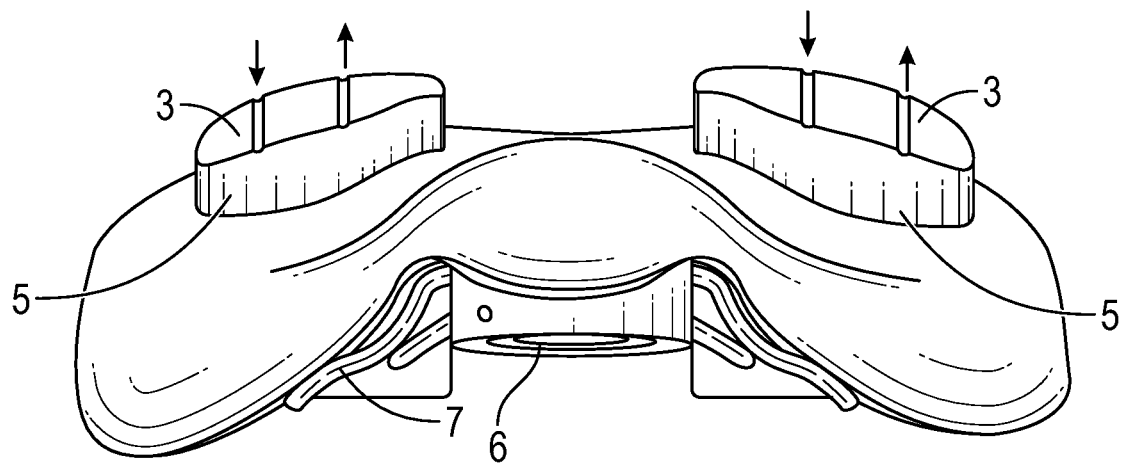
FIG. 4: show a back view of an adjustable disarticulated saddle having two disarticulated inserts coupled with an actuator device through a cord and showing the travel distance of the insert's extension and retraction movement in one embodiment thereof.

As further shown in FIGS. 3-4, an adjustable disarticulated seat (1) may include one or more a disarticulated inserts (2) having one or more insert channels (4) that are positioned in an off-set or staggered configuration compared to a cord channel (10) on the surface of a saddle (2), in this case the bottom surface. In this preferred embodiment, activation of the cord actuator (7) causes the cord (7) to retract causing the disarticulated insert (5) to extend against the user positioned on the top surface of the saddle (2), wherein the staggered configuration may generate a greater transit distance of the disarticulated insert (5) generating enhanced extension upward so as to extend beyond the top surface of the saddle (2) and against, preferably the gluteal region of a user.

In the preferred embodiment shown in FIG. 1, an adjustable disarticulated seat (1) may include one or more disarticulated inserts (2) having one or more insert channels (4) that are positioned in an off-set or staggered configuration compared to a cord channel (10) on the surface of a saddle (2) and may be responsive to a single cord (6) that is further responsive to an actuator (6). In this embodiment, the single cord (6) may be threaded at such that it is positioned within at least two insert channels (4). For example, as shown in FIG. 1, the single cord (6) is coupled with an actuator (6) and then passed through a cord channel (10) to a first insert channel (4) on a first disarticulated insert (3), where it is subsequently looped back on itself forming an anchor (8) and threaded back through a second insert channel (4). The single cord (6) then traverses the saddle to a proximal position, forming another anchor (8) position, and then is threaded back through a second disarticulated insert (3) as described above and then finally recoupled with the actuator (6). In this embodiment, activation of the actuator generates a tensile force on the cord (7) in the direction shown in FIG. 1, causing the cord (6) to tighten and extend the disarticulated insert (3) as described above. As can be appreciated, in alternative embodiments, multiple actuators, may be responsive to one or more cords that may independently extend or release an associated disarticulated insert (5) of the invention as generally described above.

In a preferred embodiment, the top surface of the disarticulated insert (5) of the invention may include extended compression support surface (9) which may provide an additional compression when positioned against a user. In preferred embodiment, the extended support surface (9) may be selected from the group consisting of: an integral extended compression surface; a detachable extended compression surface; a slide fitted extended compression surface; a snap fitted extended compression surface; an inflatable extended compression surface; an integral extended compression surface; a detachable extended compression surface; a slide fitted extended compression surface; a snap fitted extended compression surface; and an inflatable extended compression surface.

The invention may further include apparatus and methods of using an adjustable disarticulated seat having an internal suspension. In this preferred embodiment, a saddle (2) may include one or more insert interface apertures (5), each having one or more disarticulated inserts (2) positioned therein as generally described above. In this embodiment, the disarticulated insert(s) (3) can be coupled with the saddle (2) through a cord (7) secured within one or more insert channels on said disarticulated insert (3) and wherein said cord (7) is configured to suspend the disarticulated insert(s) (3) within the insert interface aperture (5), allowing the insert to sit in a suspended position with the aperture, and further provide a multi-vectored counter-compressive force in response to a force applied to the insert by a user. The cord (6) may further be responsive to an actuator (6) that is configured to increase or decrease the tensile force of the cord thereby adjusting the counter-compressive force exerted by the disarticulated insert(s) (3).

Figure 5:
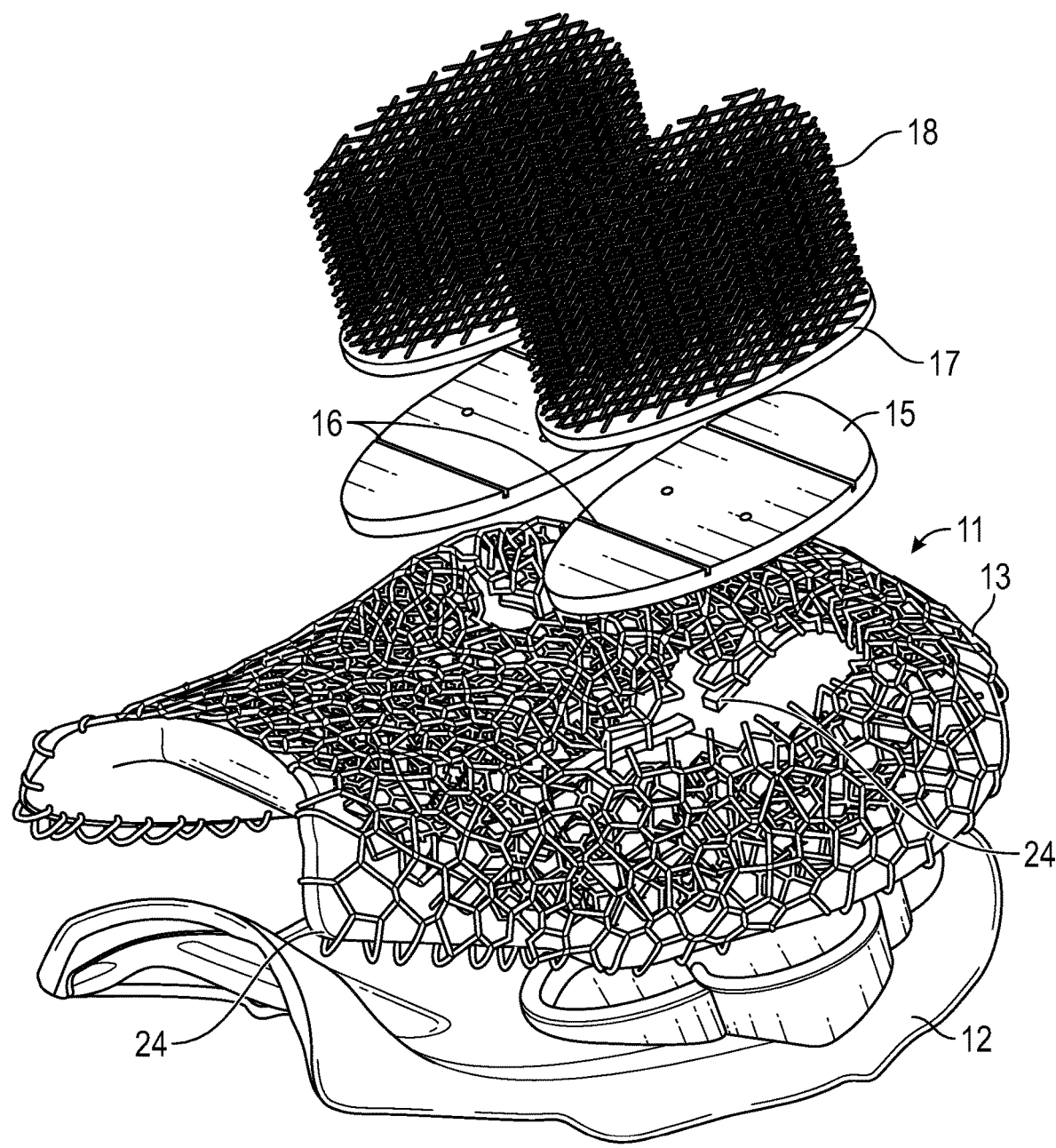
FIG. 5: shows an exploded view of an adaptive compressive seat in one embodiment thereof.
Figure 6:
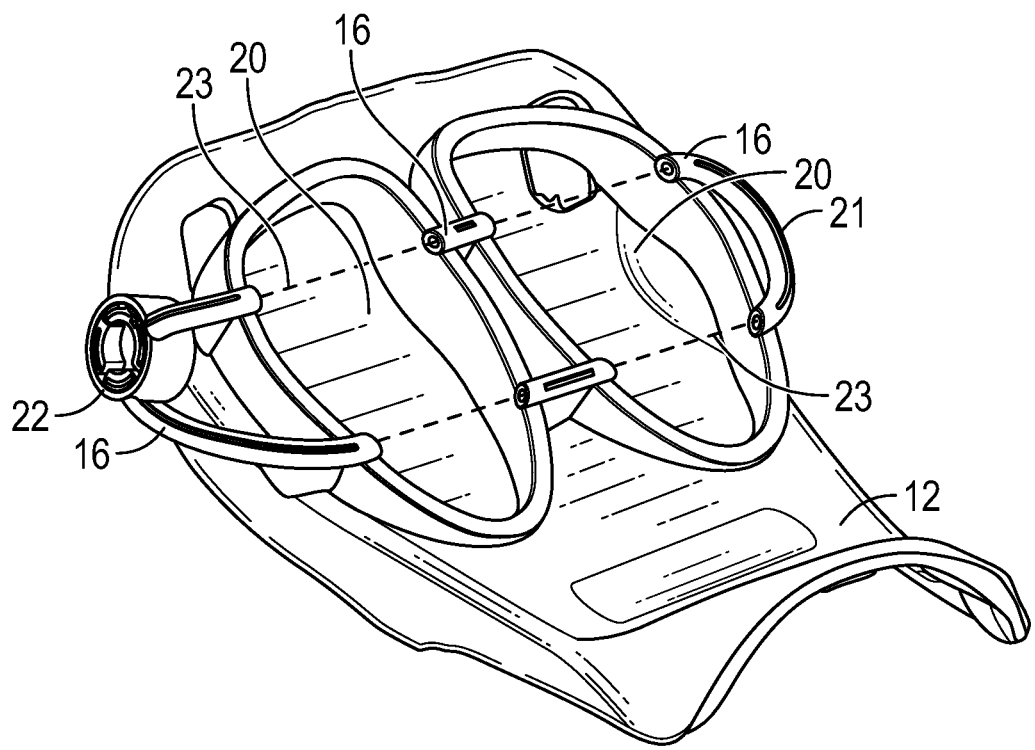
FIG. 6: shows a perspective view of an isolated base of an adaptive compressive seat in one embodiment thereof.

The invention may include a novel adaptive compressive seat (11) that may be used with a bicycle, motorcycle, chair, exercise machine, or any apparatus that may support the gluteal region of a user. As generally shown in FIGS. 5-6, in one preferred embodiment, the adjustable adaptive compressive seat (11) may include a base (12) comprising a top and bottom surface and which may further be shaped to conform to the anatomical dimension of a user and underlying vehicles. Notably, as shown in the Figures, the base (12) may include a unitary component, such as a 3-D printed saddle that may further include additional elements such as a bike or motorcycle frame attachment, or top surface cover and the like.

In one embodiment, the base (12) of the invention may be configured to be a unitary, and preferably 3D-printed component that is configured to be secured to an existing vehicle, for example through a standard vehicle seat mount or coupler (not shown) known in the art. The base (12) of the invention may be configured to be a unitary, and preferably 3D-printed component that is configured to be secured to an existing vehicle, for example by being coupled to an existing seat or saddle.

Again, as shown in FIG. 5, the base (12) of the invention may include one, or a plurality of inert pocket(s) (20) having one or more depressions further defined by raised portions configured to allow one or more compressive inserts (17) to be disposed of therein as described below. In the specific embodiment shown in FIG. 5, the base (12) of the invention includes a pair of insert pockets (20) position on the distal end of the base (12) and being positioned so as to position one or more compressive inserts (17) below the gluteal region of a user as shown in FIG. 7 generally.

Notably, the inert pocket(s) (20) of the invention may be shaped to confirm to the surface area dimension of the corresponding base (12) structure, however the placement and shape of the inert pocket(s) (20) can be variable in size, and position on the base (12). Also, while in this preferred embodiment the inert pocket(s) (20) of the invention are shown as having a bottom and side surfaces configured to accommodate one or more compressive inserts (17), in certain embodiment the inert pocket(s) (20) may include an aperture pass through the base (12) configured to accommodate a one or more disarticulated compressive inserts (17) of the invention as discussed below.

Figure 7:
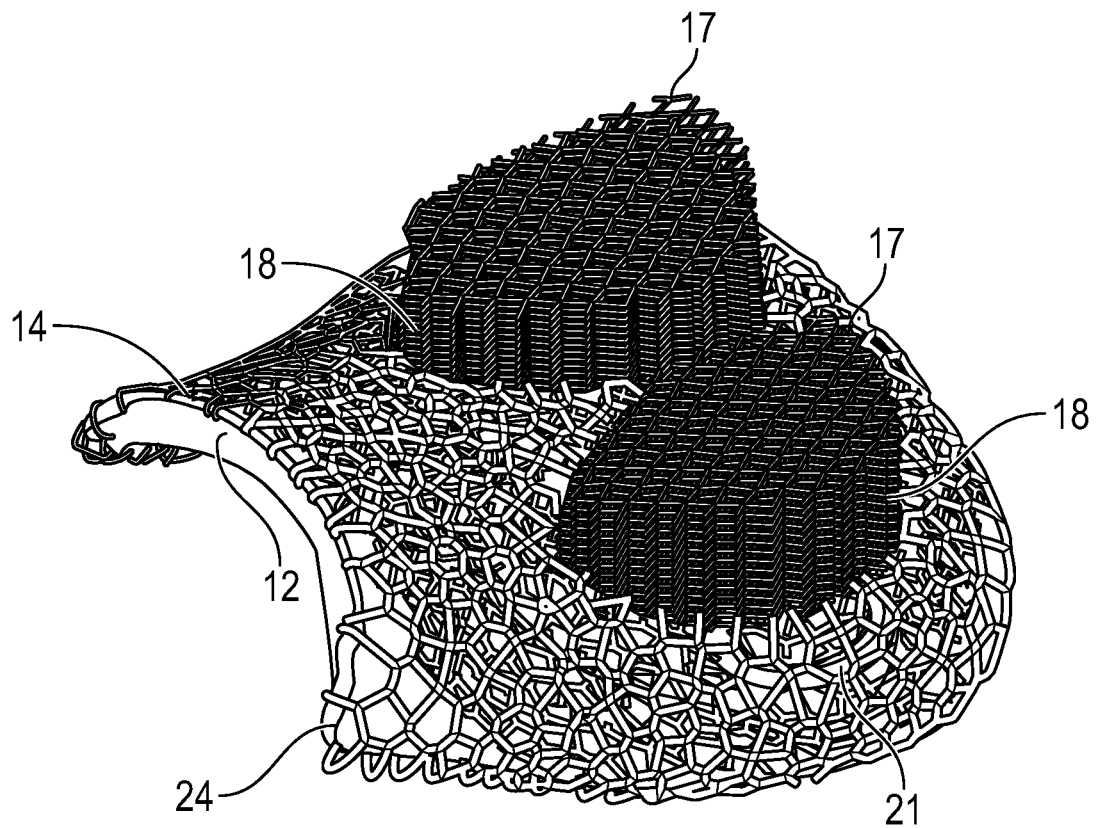
FIG. 7: shows a perspective view of an isolated compressive seat frame positioned over a base of an adaptive compressive seat securing two disarticulated compressive inserts in one embodiment thereof.

Referring to FIGS. 5-7, in a preferred embodiment, one or more disarticulated compressive inserts (17) may be positioned within each of the inert pockets (20) of the base (12) having one or more cord channels (16), which may preferably be positioned laterally or horizontally in relation to the individual compressive inserts (17). (It should be noted that this configuration is a preferred embodiment, as multiple configurations of inert channels can be contemplated, including diagonal, split, crossing, overlapping, sideways etc. . . . ) In a preferred embodiment, a cord channel (16) may be configured to secure a cord (23), which may include wires, cables, or other similar components, that is responsive to at least one actuator (22) such that activation of the actuator (22) may cause the cord (23) to retract causing the disarticulated compressive insert (17), or plurality of disarticulated compressive inserts (17) positioned within the inert pockets (20) of the base (12) to extend upward and press against the gluteal regions of a user. In additional embodiments, a cord (23) may be position directly within a cord or insert channel, while it may optionally be positioned within a removable cord cylinder (not shown) that may be secured within a continuous, or preferably a discontinuous cord channel (16) of the invention. In this embodiment, the cord channel (16) may be made of a material that facilitate the independent movement of the encased cord (23), such as Teflon®, thermoplastics or composite material.

Notably, in this embodiment, the cord (23) does not need to be anchored to the base (12). Moreover, in the event compression cord (23) breaks, or losses tensile strength and requires replacement, a user can remove a cord cylinder (not shown) from the cord channel (12) of the base (12) and may either replace it with a new cord cylinder (not shown) and/or cord (23), or re-thread the cord cylinder (not shown) with a new cord (23). The new cord cylinder (not shown) and/or cord (23) may be re-secured within the cord channel (16) of the base (12) and further re-engaged with an actuator (22). As noted above, while in this embodiment the cord channels (16) are positioned horizontally along the compressive inserts (17), in alternative embodiments one or a plurality of insert cord channel (16) of the base (12) may be positioned laterally, diagonally, or in an overlapping and operate in a similar fashion as described above to generate a synchronous (or asynchronous in the case of multiple) actuators (22) coupled with individual or groups of disparate compressive inserts (17). Also, in additional embodiments, the cord channel (16) of the invention may be configured in a discontinuous manner such that it may be positioned so as to not cross the gap between the base (12) and insert pocket(s) (20), while allowing a cord (23), responsive to an actuator (22), to be positioned across the insert pocket(s) (20). In this configuration as described in more detail below, the compressive inserts (17) may be supported by the cord (23) and be allowed to be raised above, or into the insert pocket(s) (20) of the base (12) based on the relative tension of the cord (23) generated by the actuator (22) of the invention.

In another embodiment, the cord (23) may be positioned within a cord channel (16) that may be integral or separate from the base (12). Again, referring to FIG. 6, the cord channel (16) may be positioned on the top surface of the body of the base (12) and may be configured to secure a cord (23) responsive to at least one actuator (22). The actuator (22) of the invention may also be coupled with the base (12), and preferably the side of the base (12), and even more preferably the distal end of the side of the base (12) which allows for easier access by a user positioned on a bike, motorcycle, or chair and the like. As shown in the FIG. 5, the actuator (22) may be configured to secure and wind the cord (23) causing the cord to tighten and extend the compressive inserts (17) to which the cord (23) is responsive as described herein. Conversely, the actuator (22) may be configured to release and wound the cord (23) causing the cord to slacken and release the compressive inserts (17) and allow it to retract back into the insert pocket (20). In this preferred embodiment, the actuator may include one or more locking positions such that a user can retract or release the cord (23), and by extension adjust the degree of extension or release of the disarticulated compressive inserts (17), according to a personal preference or optimization of use. Notably, a variety of actuators may be considered as encompassed by the invention, for example, in certain embodiments, an actuator (6) may be selected from the group consisting of: a twist actuator, a pull actuator, a detachable actuator, an electric actuator, and a pressure actuator.

Figure 8:
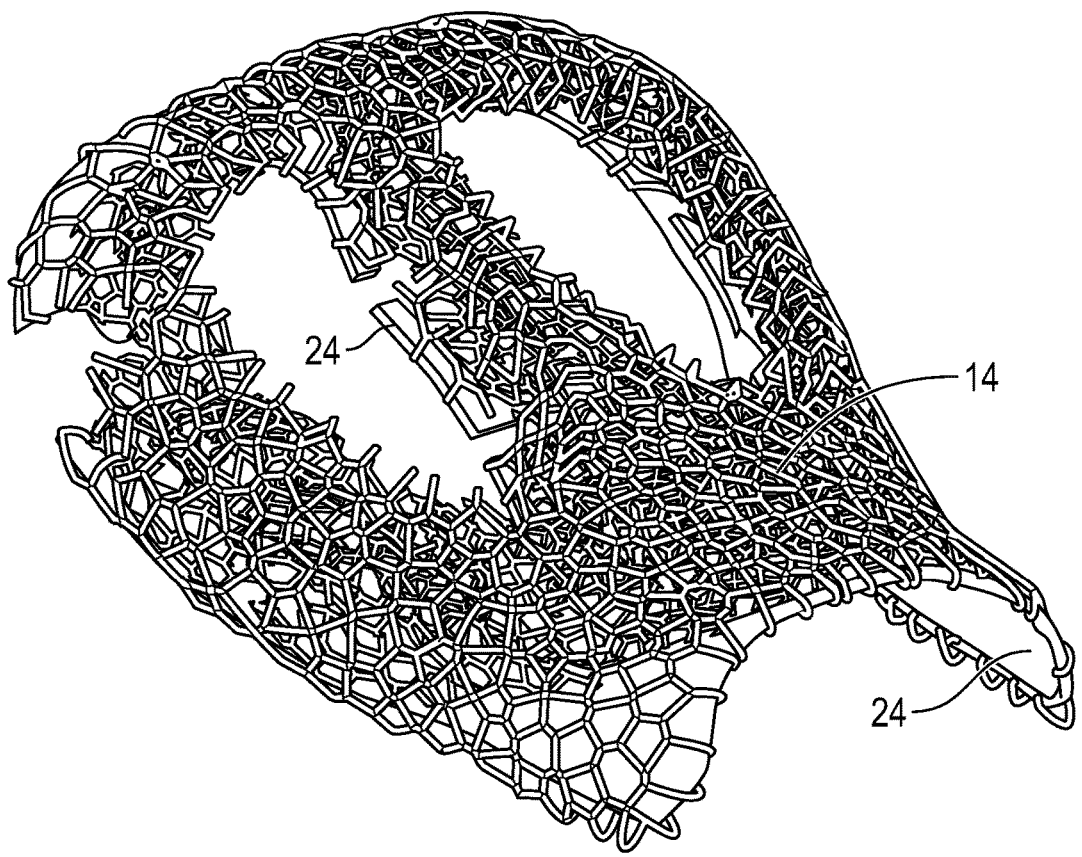
FIG. 8: shows a perspective view of an isolated compressive seat frame in one embodiment thereof.
Figure 9:
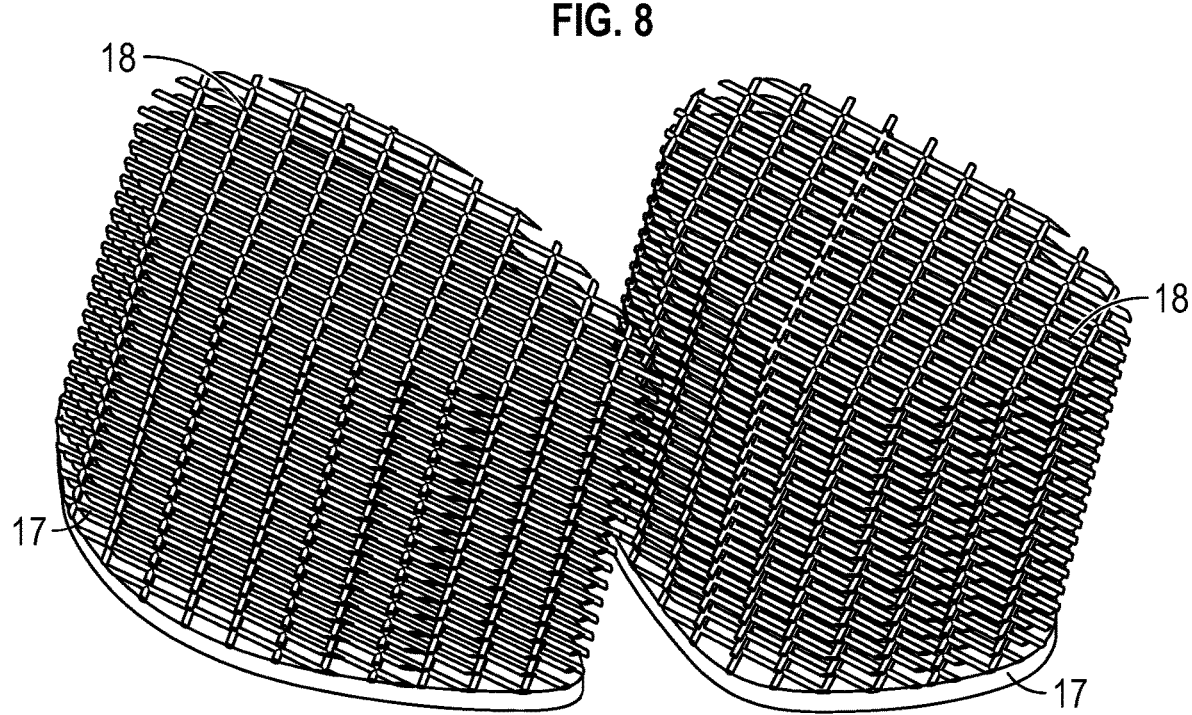
FIG. 9: shows a perspective view of a pair of isolated disarticulated compressive inserts each having a compressive matrix in one embodiment thereof.

The adaptive compressive seat (11) of the invention may include a compressive seat frame (13) configured to be positioned over, and/or secured to the base (12). Referring now to FIGS. 5, and 7-8, in one preferred embodiment, the compressive seat frame (13) may include a solid support 24) structure configured to be secured to the base (12) and preferably along the outer edges and top surface of the base (12). The compressive seat frame (13) may further include a support matrix (14) configured to extend across the upper surface of the base (12). In a preferred embodiment, the support matrix (14) of the invention may be formed from a compressive material, such as foam, gel, or plastic and the like. In another preferred embodiment shown in FIG. 5, the support matrix (14) of the invention may include a compressible matrix of interconnected geometric supports configured to be compressed in response to an externally applied force. In a preferred embodiment, the support matrix (14) may include a plurality of interconnected series of scaffold supports that are configured to be compressed in response to an externally applied force. In this embodiment, the solid side frame attachment position and support matrix (14) may be separable or an integral components, and preferably a 3D-printed integral component. As shown in FIGS. 5 and 7, the compressive seat frame (13) may include a gap configured to accommodate one or more compressive inserts (17) that may extend beyond the top surface of the support matrix (14) as described herein.

Figure 10:
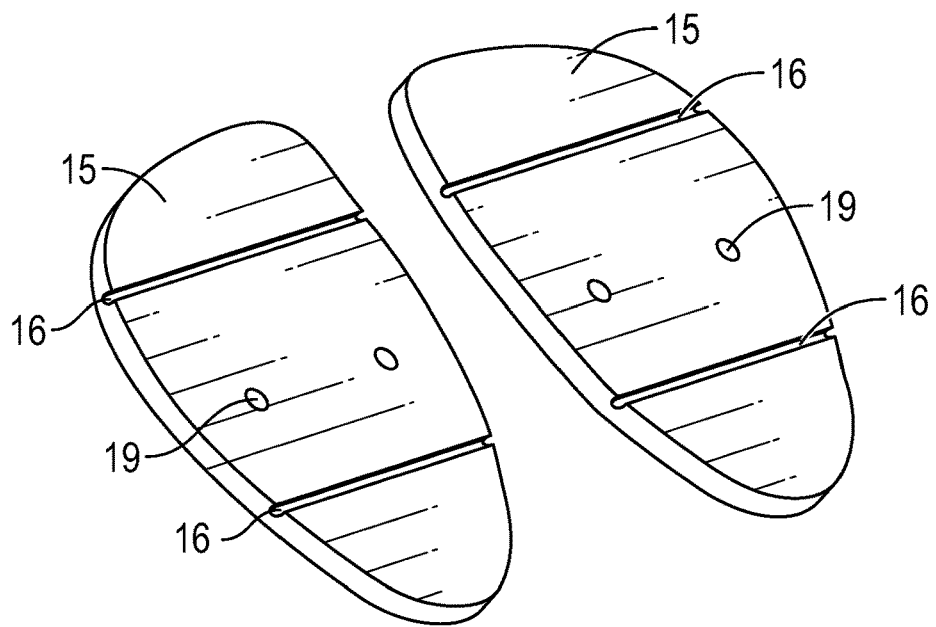
FIG. 10: shows a perspective view of a pair of isolated insert supports having a plurality of cord channels and coupler positions in one embodiment thereof.

The adaptive compressive seat (11) of the invention may further include an insert support (15). As shown in FIGS. 5 and 10, in a preferred embodiment an insert support (15) may be configured to be coupled with one or more compressive inserts (17), preferably through a coupler position (19), which is shown here as an extension that may be coupled with a aperture coupler position (19) on the bottom surface it a compressive inserts (17). It should be noted that this is an exemplary embodiment only, as a variety of coupler positions (19) may be used to coupled one compressive inserts (17) to a insert support (15), preferred examples including a snap coupler, a slide coupler, a suction coupler, a twist coupler, a lock, an adhesive, a friction coupler, a Velcro® coupler, and the like or a combination of the same.

Figure 11:
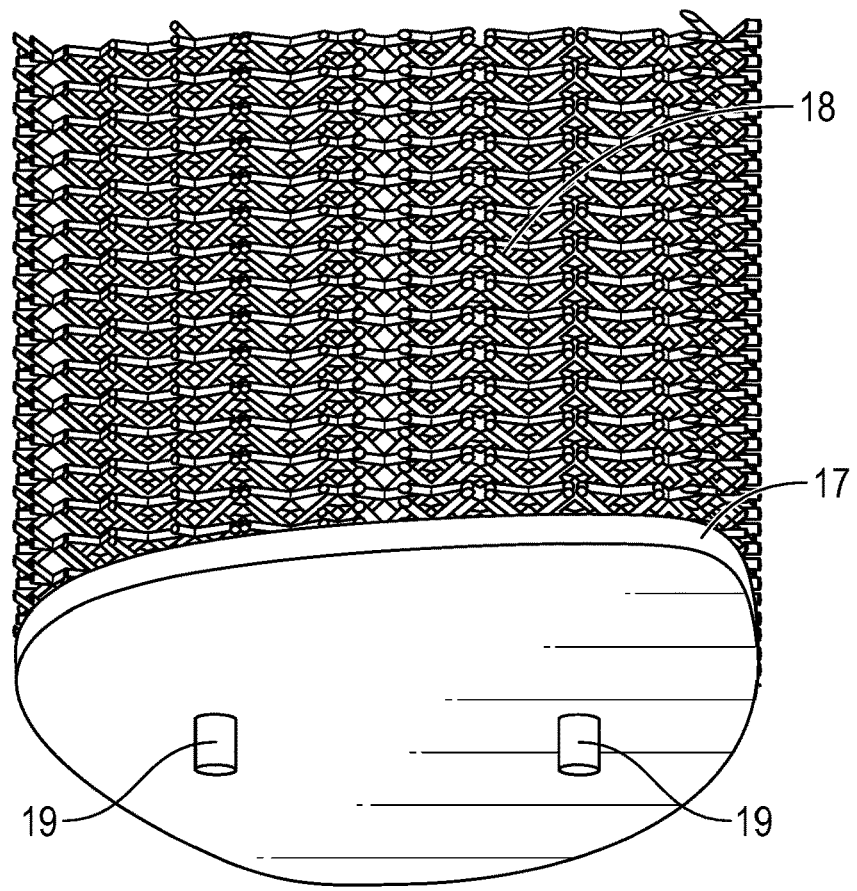
FIG. 11: is a bottom perspective view of an isolated disarticulated compressive insert having a coupler position in one embodiment thereof.
Figure 12:
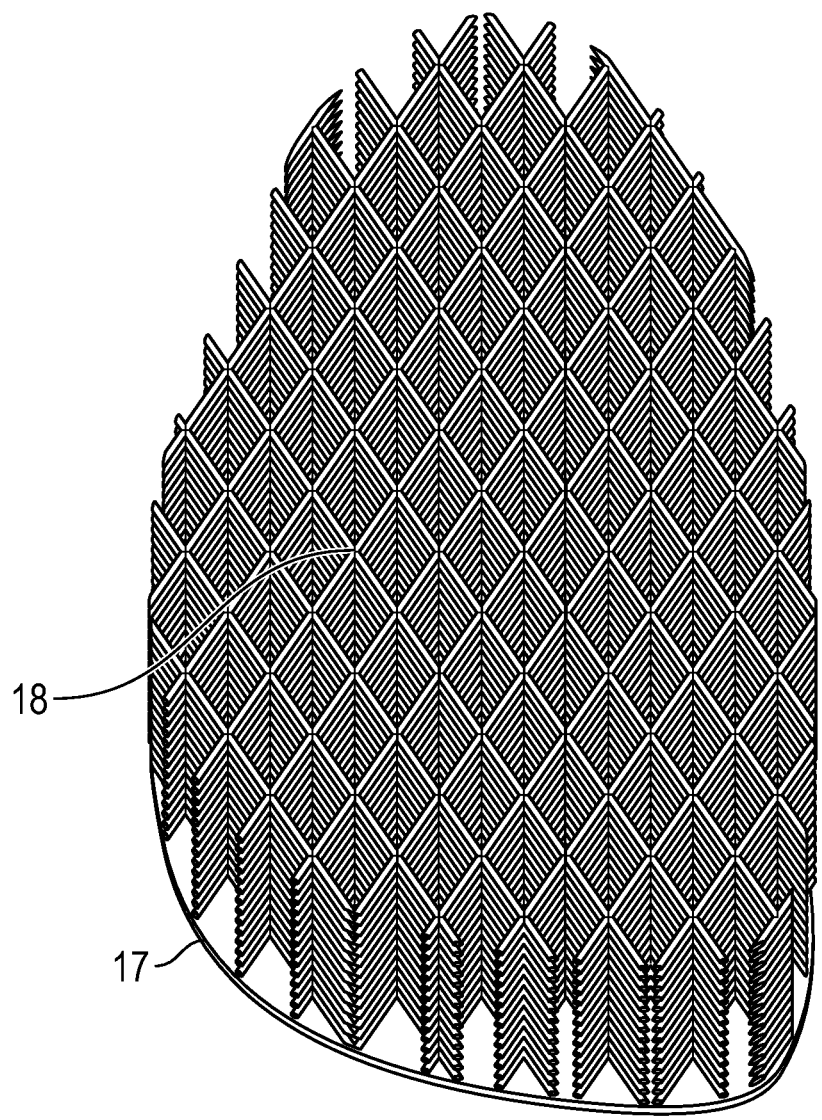
FIG. 12: is a bottom perspective view of an isolated disarticulated compressive insert having an extended compression matrix in one embodiment thereof.
Figure 13:
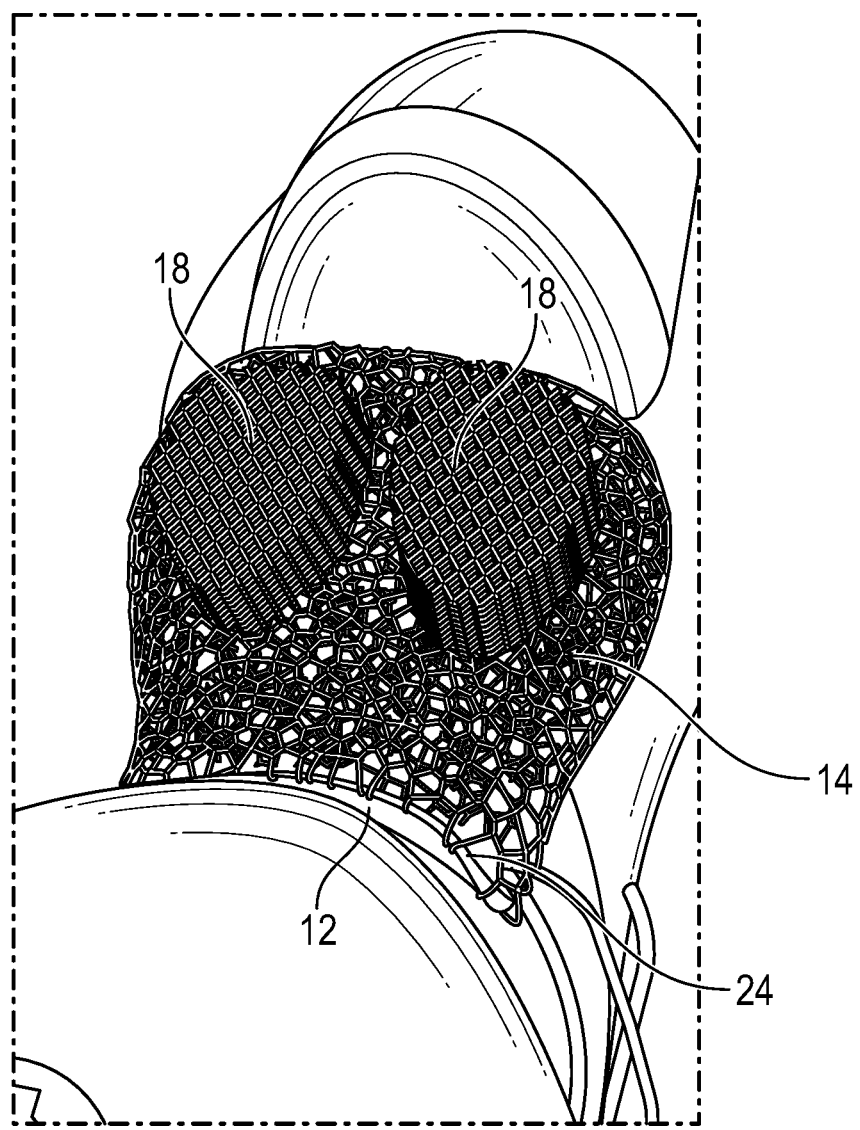
FIG. 13: shows an adaptive compressive seat positioned on an exemplary vehicle in one embodiment thereof.
Figure 14:
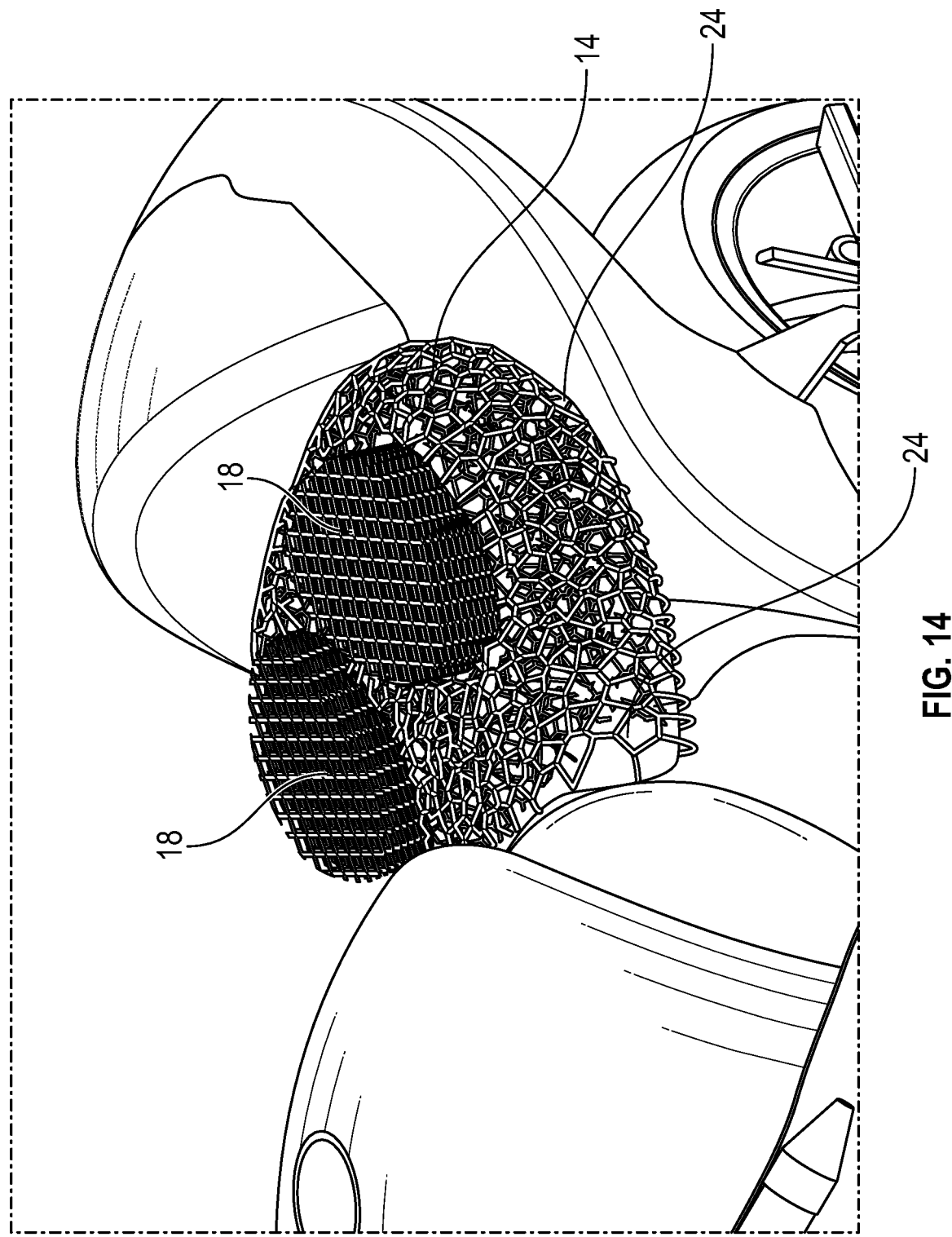
FIG. 14: shows an adaptive compressive seat positioned on an exemplary vehicle in one embodiment thereof.

As further shown in FIGS. 11-12, a compressive insert (17) of the invention may include compressive matrix (18). In one embodiment, the compression matrix (18) of the invention may include a collapsible scaffold matrix configured to compresses in response to an externally applied force, such as from a user sitting on the adaptive compressive seat (11). In this embodiment, the collapsible scaffold matrix is formed by a plurality of interconnected series of cantilevered supports that are configured to be compressed in response to an externally applied force. As noted below, the compression matrix (18) of the compressive insert (17) may be formed of a material having sufficient elasticity/rigidity to allow it to be compressed in response to an external force and decompressed and return to its original configuration once that force has been removed. Notably, a variety of matrix configurations or materials may be contemplated in this invention. For example, in certain alternative embodiments, the compression matrix (18) may include a solid compressible material, such as a gel or soft plastic or other elastic material. In additional embodiments, a collapsible scaffold matrix may include a series of springs or other supports that extend from, optionally a solid insert base.

As shown in FIG. 10, an adaptive compressive seat (11) of the invention may include one or more a disarticulated compressive insert (17) that may be coupled with an insert support (15) forming an enclosed cord groove (25) configured to secure a cord (23). In this preferred embodiment, activation of the actuator (22) causes the cord (23) to retract causing the one or more disarticulated compressive inserts (17) to extend against the user positioned on the top surface of the adaptive compressive seat (11). In the preferred embody shown in the figures, a plurality of insert support (15) having a pair of cord groove (25) may be positioned within the insert pockets (20) or the base (12). A cord (23) may extend through the cord channel (16) can be positioned within a cord groove (25) over which may be placed a disarticulated compressive insert (17) forming a plurality of paired enclosed cord grooves (25). In this preferred embodiment, activation of the actuator (22) causes the cord (23) to retract causing the disarticulated compressive inserts (17) to extend against the user positioned on the top surface of the adaptive compressive seat (11) in a synchronized manner.

In the preferred embodiment shown in FIGS. 5-12, an adaptive compressive seat (11) may include one or more compressive insert (17) having one or more cord groves (25), coupled with one or more insert supports (15) having one or more cord groves (25) that are positioned in the insert pocket (2) of a base (12) and may be responsive to a cord (23) that is further responsive to an actuator (22). In this embodiment, the cord (23) may be threaded at such that it is positioned within at least two cord channels (16). For example, as shown in FIG. 6, the single cord (23) is coupled with an actuator (22) and then passed through a cord channel (16) where it is subsequently looped back on itself forming an anchor (21) and threaded back through a cord channel (16) and recoupled to the actuator (22). In this embodiment, activation of the actuator generates a tensile force on the cord (23) in the direction shown in FIG. 6, causing the cord (23) to tighten and extend the compressive insert (17) as described above. As can be appreciated, in alternative embodiments, multiple actuators, may be independently responsive to one or more cords (23) that may independently extend or release a compressive insert (17) of the invention as generally described above.

The invention may further include apparatus and methods of using an adaptive compressive seat (11) having an internal suspension. In this preferred embodiment, a base (12) may include one or more insert pockets (20), each having one or more compressive insert (17) positioned therein as generally described above. In this embodiment, the compressive inserts (17) can be coupled with the base (12) through a cord (23) secured within one or more cord channels (16) on said insert (17) or insert support (15) and wherein said cord (23) is configured to suspend the compressive insert (17) within the insert pockets (20), allowing the insert to sit in a suspended position with the pocket, and further provide a multi-vectored counter-compressive force in response to a force applied to the insert by a user. The cord (23) may further be responsive to an actuator (22) that is configured to increase or decrease the tensile force of the cord thereby adjusting the counter-compressive force exerted by the compressive insert (17).

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish an adjustable disarticulated saddle and the like. In this application, the methods and apparatus for the aforementioned systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention may be described in some instances in method-oriented terminology, each element of the claims corresponds to a device and vice versa. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "supporting method and/or technique, and/or device" and even a "means for supporting." Such changes and alternative terms are to be understood to be explicitly included in the description.

Thus, the applicant(s) should be understood to have support to claim and make a statement of invention to at least: i) each of the methods and/or apparatus for providing an adjustable disarticulated saddle as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

Finally, Applicant reserves the right to seek additional design patent protection over the claimed invention; such that the drawings are fully enabled so as to allow one of ordinary skill in the art to know that the claimed design was in Applicant's possession at the time of filing. As such, it should be noted that any broken lines are to be included for the purpose of illustrating environmental matter and form no part of the claimed design should such become necessary.

What is claimed is:

1. An adjustable disarticulated seat comprising:
    a saddle having an insert interface aperture;
    a disarticulated insert positioned within said insert interface aperture;
    an actuator coupled with said saddle, wherein said actuator is coupled with said disarticulated insert through a cord secured within one or more insert channels on said disarticulated insert; and
    wherein said actuator retracts the secured cord and extends the disarticulated insert, or releases the secured cord allowing depression of the disarticulated insert.

2. The seat of claim 1, wherein said insert interface aperture comprises a plurality of insert interface apertures having a disarticulated insert positioned within each of said insert interface apertures.

3. The seat of claim 1, wherein said saddle having an insert interface aperture comprises a saddle having a plurality of insert interface apertures.

4. The seat of claim 3, wherein said disarticulated insert positioned within said insert interface aperture comprises a disarticulated insert positioned within each of said insert interface apertures.

5. The seat of claim 3, wherein said actuator coupled with said saddle comprises an actuator coupled with each of said disarticulated inserts through a cord secured within said insert channels on said disarticulated inserts in an opposing orientation.

6. An independently adjustable disarticulated seat comprising:
    a saddle having a plurality of insert interface apertures;
    at least one disarticulated insert positioned within each of said insert interface apertures;
    a plurality of actuators coupled with said saddle and wherein each of said actuators is coupled with at least one of said plurality of disarticulated inserts through a cord secured within one or more insert channels on each of said disarticulated inserts; and
    wherein said actuators retract the secured cord and independently extend the coupled disarticulated insert, or release the secured cord and independently allow depression the coupled disarticulated insert.

7. The seat of claim 6, wherein said plurality of insert interface apertures comprises two insert interface apertures.

8. The seat of claim 7, wherein two or more disarticulated inserts are positioned within each of said two insert interface apertures.

9. An adaptive compressive seat comprising:
    a base having an insert pocket;
    a disarticulated compressive insert having an extended compressive matrix positioned within said insert pocket;
    an actuator coupled with said disarticulated compressive insert through a cord secured within one or more cord channels; and
    wherein said actuator retracts the secured cord and extends the disarticulated compressive insert, or releases the secured cord and depresses the disarticulated compressive insert.

10. The adaptive compressive seat of claim 9, further comprising a compressive seat frame secured to said base.

11. The adaptive compressive seat of claim 10, wherein said compressive seat frame secured to said base comprises a compressive seat frame secured to said base having a support matrix.

12. The adaptive compressive seat of claim 9, further comprising an insert support coupled with said disarticulated compressive insert.

13. The adaptive compressive seat of claim 9, wherein said insert pocket comprises a plurality of insert pockets having a disarticulated compressive insert positioned within each of said insert pockets.

14. The adaptive compressive seat of claim 9, wherein said extended compressive matrix comprises a collapsible scaffold matrix.

* * * * *